Nov. 4, 1924.
A. J. CHARLTON
1,513,742
DISK WHEEL
Filed Dec. 20, 1923
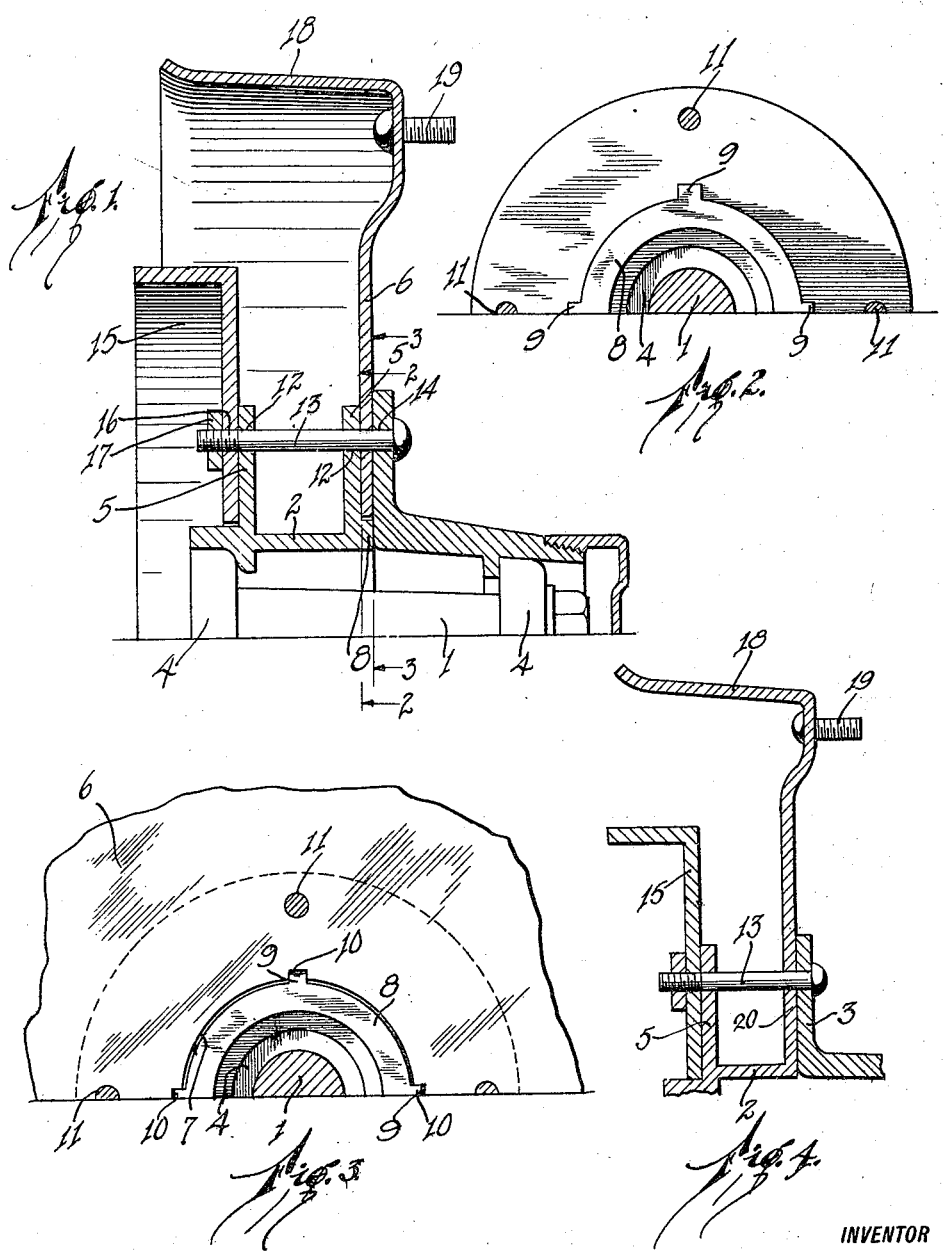
INVENTOR
A.J.Charlton
BY Munn &Co.
ATTORNEYS Patented Nov. 4, 1924.

1,513,742

UNITED STATES PATENT OFFICE.

ALBERT JOHN CHARLTON, OF LOWDEN, IOWA.

DISK WHEEL.

Application filed December 20, 1923. Serial No. 681,840.

*To all whom it may concern:*

Be it known that I, ALBERT J. CHARLTON, a citizen of the United States, and a resident of Lowden, in the county of Cedar and State of Iowa, have invented a new and useful Improvement in Disk Wheels, of which the following is a full, clear, and exact description.

My invention relates to improvements in disk wheels, and it consists in the combinations, constructions, and arrangements herein described and claimed.

An object of my invention is to provide a disk wheel of the type described that may be used in conjunction with the ordinary type of artillery wheel hub, thereby eliminating the necessity of the provision of a special hub forming a part of the wheel.

A further object of my invention is to provide a device of the type described that is particularly rigid and simple in construction.

A further object of my invention is to provide a device of the type described that may be applied to the ordinary type of artillery wheel hub without the use of special tools or the like and which may be easily removed for repair.

Other objects and advantages will appear in the following specification, and the novel features of the invention will be particularly pointed out in the appended claims.

My invention is illustrated in the accompanying drawings, forming part of this application, in which—

Figure 1 is a sectional view of an embodiment of my invention,

Figure 2 is an end elevation of the mechanism shown in Figure 1 with the disk and outer hub members removed, Figure 3 is a view along the line 3—3 of Figure 1, and Figure 4 is a sectional view of a modified form of my invention.

In carrying out my invention, I make use of a vehicle hub consisting of a pair of co-operating and aligned members 2 and 3, within which bearings 4 are disposed for rotatably supporting the hub upon the axle 1.

The hub member 2 is constructed after the manner of the ordinary type of artillery wheel hub having a pair of radially extending flanges 5 upon which the wooden spokes of the wheel are ordinarily placed. In my present invention, however, I remove the wooden spokes and substitute therefor the steel disk 6 having an opening 7 centrally located therein, which is arranged to encompass an annular lip 8 extending outwardly from the member 2. This lip 8, (see Figure 2) has a plurality of radially extending lug members 9 which are arranged to be received in angular recesses 10 in the disk member 6 so as to effectually prevent rotation of the disk 6 relative to the hub 2.

Means for further stopping rotation of the disk 6 relative to the hub member 2 is provided in a plurality of openings 11 through the disk 6, and aligned openings 12 in the radial flanges 5 of the hub member 2 through which bolts 13 are projected. These bolts 13 are also projected through the hub member 3 by means of openings 14 and serve to hold the hub member 3 in rigid registration with the hub member 2. A brake drum 15 is provided with openings 16 through which the bolts 13 are projected, and each bolt 13 is provided with an end 17 by means of which the disk 6 hub members 2 and 3, and the brake drum 15 are locked against movement relative to one another.

The disk 6 terminates at its outer edge with a rim supporting flange 18 disposed substantially parallel to the axle 1 and is further provided with a plurality of bolts 19 adjacent to the portion 18 by means of which a rim, (not shown) may be secured upon the disk for the purpose of supporting a vehicle tire.

From the foregoing description of the various parts of the device, the operation thereof may be readily understood. In applying my improved disk wheel to the ordinary type of motor vehicle having hub members 2 and 3, the hub member 2 being provided with lugs 9 on the lip 8, it is first necessary to separate the members 2 and 3 and to place the disk 6 concentric with the lip portion 8 of the hub member 2 so that the recesses 10 therein may register and encompass the lugs 9.

The brake drum 15 is then placed against the flange 5 at the rear of the hub member 2 and the bolts 13 are projected through the aligned openings 14, 12, 12, and 16. The nuts 17 are then tightened so as to lock the entire wheel assembly in its operative position.

The wheel at this time is ready for placement of a vehicle tire supporting rim of any well known structure.

In Figure 4 I have shown a modified form of my invention, in which the disk 6 is formed as an integral part of the other flange 5 as shown at 20 of the hub member 2. This particular construction eliminates entirely the necessity of the provision of the lugs 9 on the member 2 and of the recesses 10. The hub member 3 is secured directly to the hub member 2 by means of bolts 13 which also serve to lock the brake drum 15 in place.

The operation of this form of the device is precisely the same as in the preferred form, with the exception that there are fewer parts to assemble, and that when the disk is to be removed from the axle 1 it is necessary to remove the hub member 2 while in the preferred form of disk 6, it might easily be removed from the hub member 2 without the removal of the member from the axle.

I claim:

1. A disk wheel of the type described having a hub member having a radially extending flange, a disk having a rim portion and a central opening and having recesses extending radially from said central opening, said hub member having radially extending lug members arranged to enter said recesses in said disk by means of which said disk when placed upon said hub member may not rotate relative thereto, and means for locking said disk in close engagement with said radial flange.

2. A disk wheel of the type described comprising a hub member having a pair of radially extending flanges, a disk having a rim member at the outer peripheral edge thereof and a central opening, said disk and said hub member having interlocking portions, whereby said disk may not rotate relative to said hub member when placed thereupon, a brake drum arranged to be mounted at the opposite end of said hub member, and means for locking said brake drum against movement relative to the remaining flange, whereby said disk, brake drum, and said hub member may form a single unit.

3. A disk wheel of the type described comprising a hub member having a radially extending flange, a disk having a rim portion at the outer peripheral edge thereof, and a central opening, interlocking portions formed on said hub member and said disk for preventing rotation of said disk when mounted upon said hub member, and a second hub member arranged to cooperate with said first named hub member disposed in axial alignment with the first named hub member, and means for locking said hub members and said disk in close engagement with one another to form a single unit.

ALBERT JOHN CHARLTON.